United States Patent [19]

Gamba

[11] 4,398,175

[45] Aug. 9, 1983

[54] APPARATUS FOR AUTOMATICALLY CANCELLING A TURN SIGNAL

[76] Inventor: Gregory G. Gamba, 646 Freeman St., Orange, N.J. 07050

[21] Appl. No.: 179,774

[22] Filed: Aug. 20, 1980

[51] Int. Cl.³ ............................................. B60Q 1/34
[52] U.S. Cl. .................................... 340/73; 340/134; 200/61.3; 200/61.45 R
[58] Field of Search ........................ 340/73, 134, 56; 200/61.3, 61.45, 61.52, 61.27

[56] References Cited

U.S. PATENT DOCUMENTS 3,876,976  4/1975  Cross, Jr. ............................ 340/134
3,914,566  10/1975 Wendling ........................... 200/61.3
4,216,459  8/1980  Harata et al. ...................... 340/134

FOREIGN PATENT DOCUMENTS 52-42091  4/1977  Japan ................................... 340/134

Primary Examiner—Donald J. Tusko
Attorney, Agent, or Firm—Howard N. Sommers

[57] ABSTRACT

An apparatus for automatically cancelling a turn signal, responsive to displacement of the center of gravity of a vehicle such as a motorcycle in moving into a turn. The apparatus includes means for signalling the turn, means for retaining the turn signalling means in turn signalling position or releasing the turn signalling means from turn signalling position, and means for controlling the turn signal retaining means responsive to displacement of the center of gravity of the vehicle in moving into the turn.

4 Claims, 15 Drawing Figures

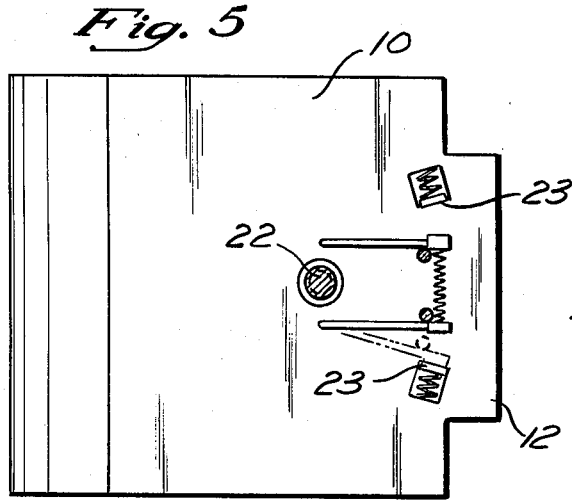
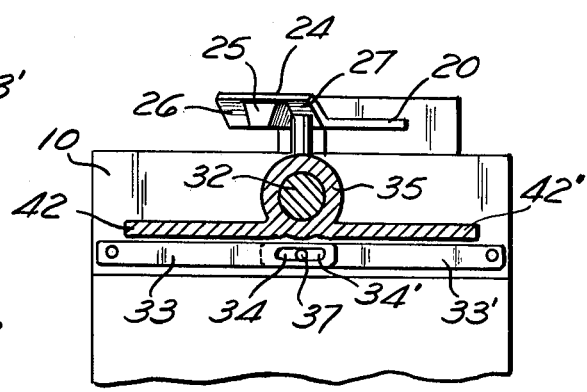
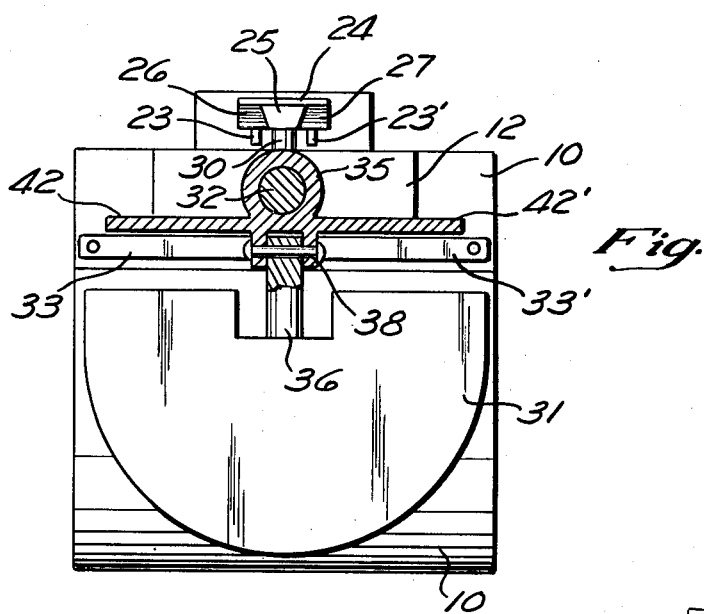
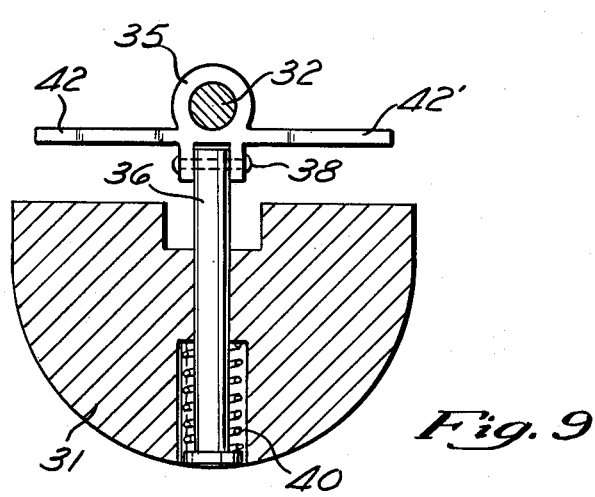
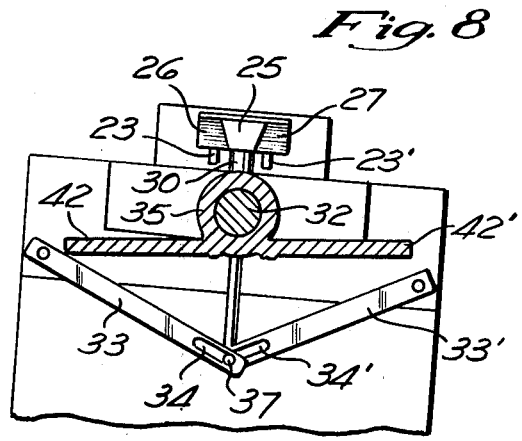

APPARATUS FOR AUTOMATICALLY CANCELLING A TURN SIGNAL

BACKGROUND OF THE INVENTION

1. Field of the Invention

The invention relates generally to turn signal control devices, and relates specifically to an apparatus for automatically cancelling a turn signal.

2. Description of the Prior Art

In vehicles such as motorcycles or the like, there is no return corresponding to the return of a steering wheel, as in an automobile or the like, to enable automatic cancellation of a turn signal.

Turn signal control devices presently known for use in vehicles such as motorcycles or the like are manually operable. As a consequence thereof, such devices enable signals to continue to flash after a turn is completed if the driver forgets to manually turn the signal off, or enable the signal to continue to flash if left on when the vehicle such as a motorcycle or the like is parked. Continued flashing of the signal endangers the vehicle operator as well as others on the road in anticipation of a further turn by the vehicle, and continued flashing runs down the electrical power for operating the turn signal and the electrical power necessary for operating the vehicle, which can result in a dead battery.

SUMMARY OF THE INVENTION

In view of the problems referred to above, as well as others, it is among the objects of the invention to provide an apparatus for automatically cancelling a turn signal, so as to prevent continued flashing of the turn signal after completion of the turn, and so as to prevent continued flashing of the turn signal when the vehicle is parked.

The objects referred to above, as well as others, are provided for in the invention by means of an apparatus for automatically cancelling a turn signal responsive to displacement of the center of gravity of a vehicle such as a motorcycle in moving into a turn. The apparatus includes means for signalling the turn, means for retaining the turn signalling means in turn signalling position or releasing the turn signalling means from turn signalling position, and means for controlling the turn signal retaining means responsive to displacement of the center of gravity of the vehicle in moving into the turn.

DESCRIPTION OF THE DRAWINGS

The invention is illustrated, by way of example thereof, in the accompanying drawings, wherein:

FIG. 5 is a bottom plan view thereof;

FIG. 6 is a rear elevational, partly fragmentary view of the automatic cancelling apparatus prior to the vehicle making a turn;

FIG. 7 is a similar view with the weight shown;

FIG. 8 is a similar view as the vehicle moves into the turn;

FIG. 9 is a rear cross sectional elevational view of the weight and shock absorber of the automatic cancelling apparatus pursuant to the invention;

DESCRIPTION OF THE PREFERRED EMBODIMENT

In the preferred embodiment of the invention, as illustrated in FIGS. 1–11, the invention comprises an apparatus for automatically cancelling a manually-initiated vehicle turn signal responsive to displacement of the center of gravity of a vehicle such as a motorcycle in moving into a turn and for maintaining the turn signal in cancelled condition until a further turn signal is manually initiated by closing one of a pair of vehicle turn signal circuits (not shown).

Figure 2:
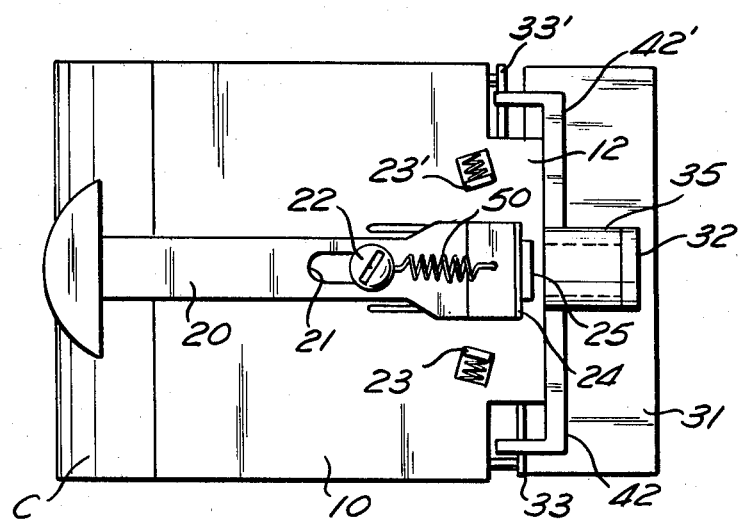
FIG. 2 is a top plan view thereof.
Figure 1:
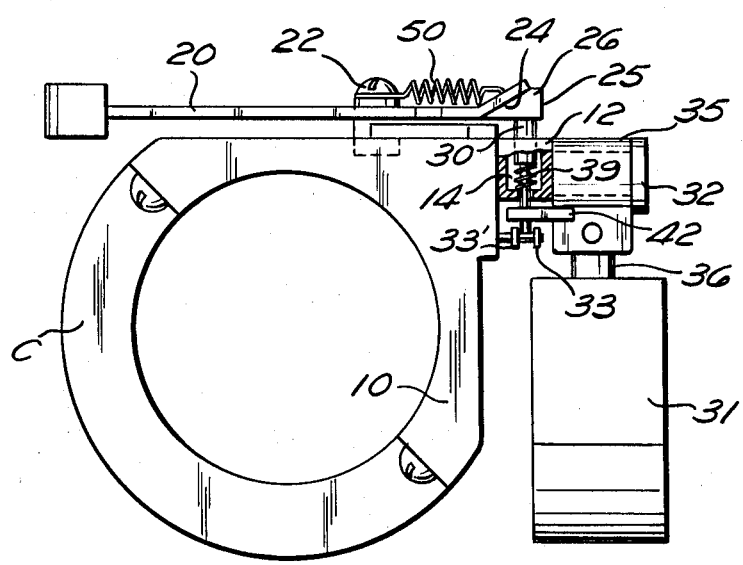
FIG. 1 is a side elevational view of an apparatus for automatically cancelling a turn signal pursuant to the invention.
Figure 4:
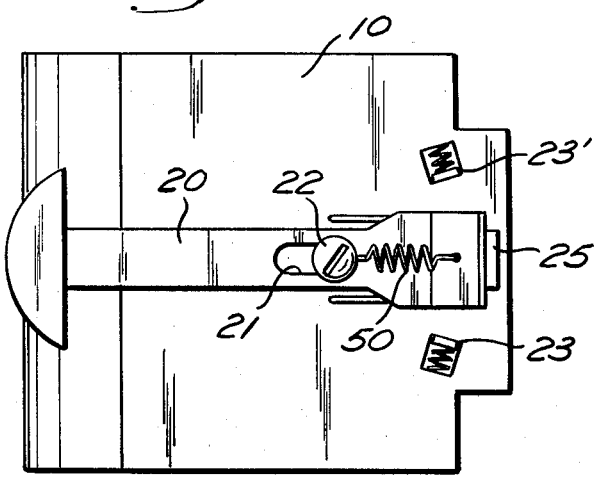
FIG. 4 is a top plan view of the frame, turn signal lever, and switch contact points in the automatic cancelling apparatus pursuant to the invention.
Figure 3:
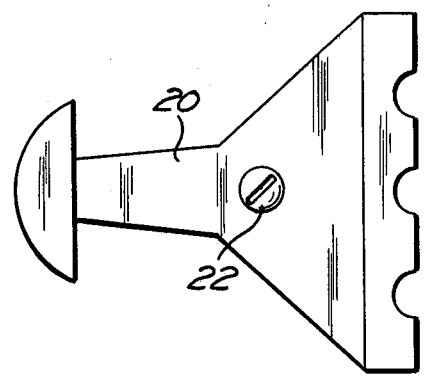
FIG. 3 is a top plan view of a further embodiment of a turn signal lever pursuant to the invention.

The apparatus may be secured to the handlebar of a vehicle such as a motorcycle by a clamp as C in FIG. 1.

The apparatus, as illustrated in FIGS. 1–11, includes a frame 10, means for signalling a turn, pivotally slideably connected to frame 10, means for retaining the turn signalling means in turn signalling position or releasing the turn signalling means from turn signalling position, and means for controlling the turn signal retaining means responsive to displacement of the center of gravity of the vehicle in moving into the turn. Frame 10 is adapted to be mounted on the motorcycle handlebar as by Clamp C.

Frame 10, as shown in FIG. 1, further includes an extending portion 12, having a channel 14 extending therethrough. The turn signalling means, as illustrated in FIGS. 1–5 and 10–11, comprise a turn signal lever 20, means for pivotally slideably connecting the turn signal lever 20 to frame 10, and means for enabling closing of the turn signal circuit for signalling a turn upon engagement of the turn signal lever 20 therewith when lever 20 is manually selectively movable in the direction of the intended turn of the motorcycle. The turn signal lever pivotally slideably connecting means comprise a slot 21 in lever 20 and a connector 22 extending through slot 21 and turn signal lever 20 into frame 10. The circuit closing enabling means comprise a pair of electrical contacts 23, 23', spring-loaded movable with lever 20 relative to a pair of turn signal circuits (not shown) and adapted to close one of the vehicle turn signal circuits responsive to such movement of lever 20.

The turn signal retaining means include portions of lever 20, at the rear end section thereof, adapted to enable lever 20 to be retained in the manually selected position. Such portions comprise an angled end 24 of the turn signal lever 20, for retaining the turn signal lever 20 in signalling position, which include a generally triangular-solid shaped medial portion 25, for neutral, and a pair of side portions 26 and 27, defining spaces therein, for left or right turns.

The turn signal controlling means comprise a release post 30 for engaging the retention-enabling rear portion of lever 20, reciprocally, mounted in frame 10, engageable with the turn signal lever angled end 24, means for biasing release post 30 into engagement with lever 20 comprising a spring 39, connected at one end to frame extending portion 12, and at the other end to post 30, and means for automatically releasing lever 20 from the manually-selected position responsive to gravitational force exerted on such automatic arm-releasing means upon displacement of the center of gravity of the vehicle on movement of the vehicle in the direction of the signalled turn, to open the selectively-closed vehicle turn signal circuit and cancel the turn signal, by moving the release post 30 responsive to displacement of the center of gravity of the vehicle. Post 30 is reciprocally movable in channel 14 of frame extending portion 12, through which it extends. The release post moving means comprise a weight 31, a pivot pin 32 mounted in the frame 10 and means for connecting the weight 31 to the pivot pin 32 and release post 30. The connecting means, as shown in FIG. 9, comprise a plurality of movable arms 33, 33', each connected at one end to the frame 10, and each including slots 34, 34' in the free ends thereof, a linkage member 35 including extending arms 42, 42', connected to the pivot pin 32, and a connecting rod 36 connecting the linkage member 35 to the weight 31. Release post 30 has, at its lower end, a pin 37 extending therefrom engageable in the slots 34, 34' in the free ends of the movable arms 33, 33' connecting release post 30 to movable arms 33, 33' such that release post 30 is reciprocally movable responsive to pressure exerted thereon by linkage 35, in response to movement of weight 31.

The apparatus further includes means for absorbing movement of weight 31 responsive to vibration, to absorb shock generated by road conditions, such as the vehicle riding over a rock or a hole in the road, to prevent interference thereby with the operation of apparatus, which comprises means for resiliently connecting weight 31 to connecting arm 36, comprising spring 40 extending about connecting arm 36 and connecting with weight 31.

The apparatus further includes means for biasing lever 20 in a non-signal-initiating position, and for manually releasing lever 20 from the manually-selected position, to open the selectively closed vehicle turn signal circuit and cancel the turn signal, for cancelling a turn signal as desired by the vehicle operator, which comprise means for resiliently connecting the angled end 24 of the turn signal lever 20 to connector 13, comprising spring 50.

The apparatus is secured to the vehicle, as to the handlebar of a vehicle such as a motorcycle, by clamp C.

The operator, prior to the time the vehicle is about to enter a turn, pushes the turn signal lever 11 to the right or left, depending on the direction of the turn to be made. Such movement of turn signal lever 20 permits the release of release post 30, biased upwardly by spring 39, which lifts up and engages angled end 24 of turn signal lever 20 to hold turn signal lever 20 in the "on" position. Such movement of turn signal lever 20 further depresses spring-loaded contacts 23, 23' as shown in FIG. 5 closing the appropriate turn signal circuit for signalling the turn so that the appropriate turn blinker in "on." For example, for a right turn, the driver of the motorcycle turns lever 20 to the right, releasing post 30, previously held down by the bottom of lever medial portion 25, such that it moves upwardly under pressure exerted by biasing spring 39 into engagement with lever angled end side portion 27, as shown in FIG. 6, and turning the right-turn signal blinker "on."

As the vehicle enters the turn, weight 31 retains its generally-vertical orientation, as does connecting rod 36, while extending arms 42, 42' of linkage member 35 retain their generally-horizontal orientation, while the rest of the apparatus tilts with the motorcycle. One of the linkage extending arms 42 or 42', depending upon the direction of tilt of the vehicle, bears against the corresponding arm 33 or 33', pivoting it downwardly, causing downward movement of pin 37, captured in slots 34, 34' in arms 33, 33' through which it projects, and thereby causing downward movement of post 30, from which pin 37 projects, whereupon the bottom surface of lever angled end medial portion 25 engages the top of post 30, as shown in FIG. 8, to retain post 30 in the neutral "off" position, as shown in FIG. 7.

Upon completion of the turn and uprighting of the vehicle, the linkage arms 42, 42', connecting arm 36, pin 37, and movable arms 33, 33' are retained in the neutral "off" position by turn signal lever 20 holding release post 30 in its down position, as shown in FIG. 7. The apparatus is then ready for another turn to be signalled.

Figure 11A:
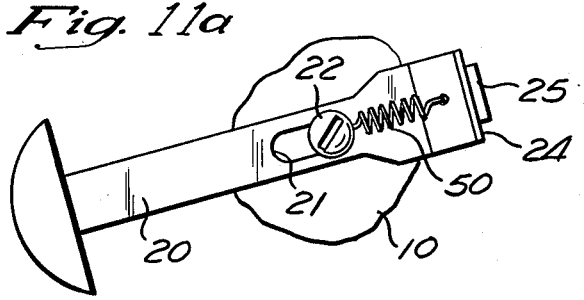
FIGS. 11A, B and C are top plan views thereof.
Figure 11B:
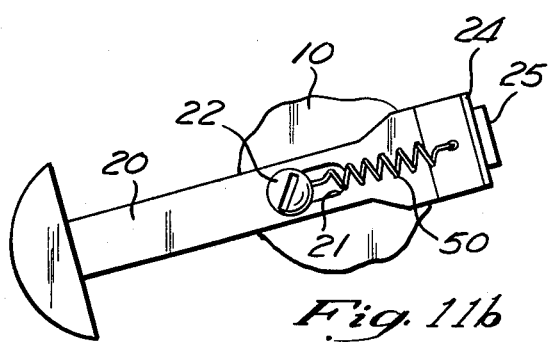
Figure 11C:
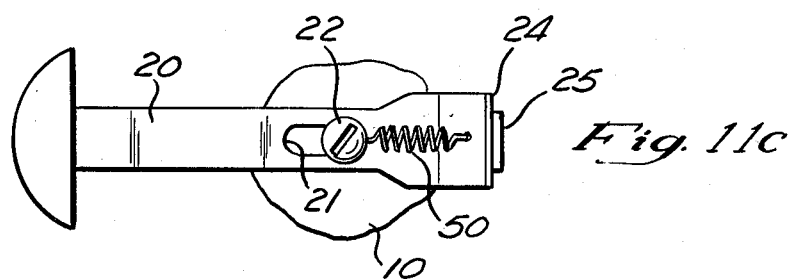
Figure 10A:
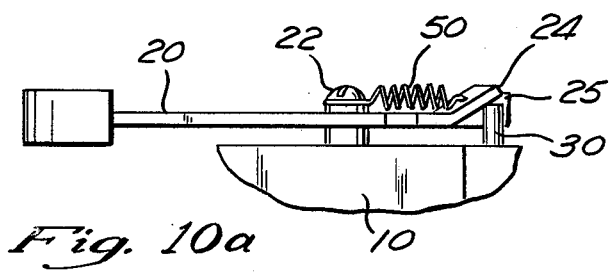
FIGS. 10A, B, and C are side elevational views of the steps in manually cancelling the turn signal in accordance with the invention.
Figure 10B:
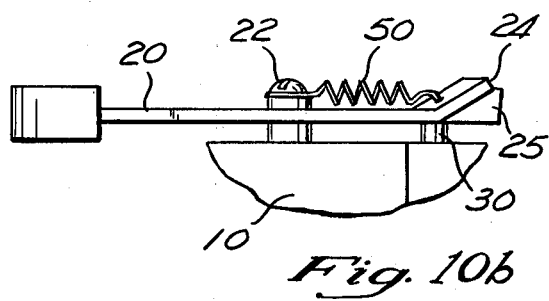
Figure 10C:
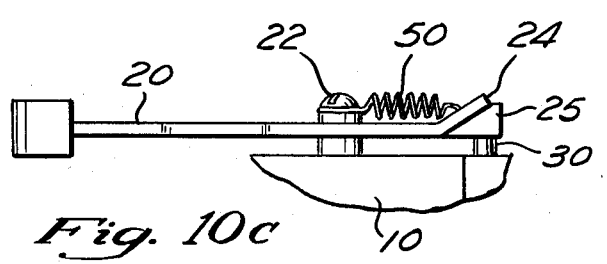

If the operator decides not to make the turn after moving the turn signal lever 20 to the "on" position, the operator pushes the turn signal lever 20 in the forward direction, and the angled end 24 thereof pushes release post 30 downwardly, which permits the turn signal lever 20 to return to the center "neutral" position, as shown in FIGS. 10–11.

To protect the apparatus from road bump interference with the turn signal, spring 40 interconnects connecting arm 36 to weight 31, as shown in FIG. 9. As the motorcycle hits a bump, weight 31 moves downwardly with spring 40 absorbing the shock, and returns to the normal position, preventing side-to-side motion which might cause cancellation of the signal. Weight 31 is further hinged at hinge post 38 for front and back motion so as to prevent vibrational effects on movement of weight thereof.

The apparatus provides automatic cancelling of the turn signal in an efficient and convenient manner, so as to insure operator safety and enable operators of other vehicles on the road to determine the intentions of the vehicle operator, and prevents continued flashing of the turn signal after completion of the turn or when the vehicle is parked, to prevent rundown of the electrical power supply on the vehicle, which might otherwise result in a dead battery.

The preferred embodiment of the invention has been set forth above. It is to be understood, however, that variations may be made in such preferred embodiment, which variations may nevertheless be within the scope and spirit of the invention. The invention is therefore to be broadly construed within the scope and spirit of the claims appended hereto.

I claim:

1. An apparatus for automatically cancelling a manually-initiated vehicle turn signal responsive to movement of the vehicle in the direction of the turn so signalled and for maintaining the turn signal in cancelled condition until a further turn signal is manually initiated by closing one of a pair of vehicle turn signal circuits, comprising:

(a) a frame, adapted to be mounted on the vehicle;

(b) an arm, pivotally mounted on the frame, manually selectively movable in the direction of the intended turn of the vehicle, which includes portions adapted to enable the arm to be retained in the manually selected position, and a pair of electrical contacts, movable with the arm relative to the pair of vehicle turn signal circuits and adapted to close one of the vehicle turn signal circuits responsive to such movement of the arm;

(c) means for biasing the arm in a non-signal-initiating position, connected to the frame;
(d) means for engaging the arm retention-enabling portions, reciprocally mounted in the frame;
(e) means for biasing the engaging means into engagement with the arm; and
(f) means, mounted in the frame and connected to the arm engaging means, for automatically releasing the arm from the manually-selected position responsive to gravitational force exerted on such automatic arm-releasing means upon displacement of the center of gravity of the vehicle on movement of the vehicle in the direction of the signalled turn, to open the selectively-closed vehicle turn signal circuit and cancel the turn signal.

2. An apparatus as in claim 1, further comprising means for manually releasing the arm from the manually-selected position, to open the selectively closed vehicle turn signal circuit and cancel the turn signal.

3. An apparatus as in claim 1, in which the automatic arm releasing means comprise a weight, means for pivotally connecting the weight to the frame, and means for connecting the weight-connecting means to the arm engaging means, reciprocally movable responsive to pressure exerted thereon by the weight-connecting means.

4. An apparatus as in claim 3, further comprising means for absorbing movement of the weight responsive to vibration.

* * * * *